United States Patent
Olson et al.

[11] Patent Number: 6,032,249
[45] Date of Patent: Feb. 29, 2000

[54] METHOD AND SYSTEM FOR EXECUTING A SERIALIZING INSTRUCTION WHILE BYPASSING A FLOATING POINT UNIT PIPELINE

[75] Inventors: Christopher Hans Olson, Austin; Jeffrey Scott Brooks, Round Rock, both of Tex.

[73] Assignee: International Business Machines Corporation, Armonk, N.Y.

[21] Appl. No.: 09/016,981

[22] Filed: Feb. 2, 1998

[51] Int. Cl.$^7$ ........................................... G06F 9/30
[52] U.S. Cl. .................. 712/200; 712/203; 712/214; 712/220; 712/222
[58] Field of Search ........................ 712/214, 218, 712/219, 205, 200, 203, 220, 222

[56] References Cited

U.S. PATENT DOCUMENTS

| | | | |
|---|---|---|---|
| 4,800,516 | 1/1989 | Si et al. ................................ | 364/748 |
| 5,150,470 | 9/1992 | Hicks et al. ......................... | 395/393 |
| 5,185,872 | 2/1993 | Arnold et al. ....................... | 395/375 |
| 5,257,216 | 10/1993 | Sweedler ............................. | 364/748 |
| 5,488,729 | 1/1996 | Vegesna et al. ..................... | 395/800 |
| 5,524,255 | 6/1996 | Beard et al. ........................ | 395/800 |
| 5,537,629 | 7/1996 | Brown et al. ....................... | 395/375 |
| 5,546,597 | 8/1996 | Martell et al. ...................... | 395/800 |
| 5,555,384 | 9/1996 | Roberts et al. ..................... | 395/375 |
| 5,560,039 | 9/1996 | Dulong ................................ | 395/800 |
| 5,594,864 | 1/1997 | Trauben .......................... | 395/183.15 |
| 5,594,913 | 1/1997 | Ostler et al. ........................ | 711/218 |
| 5,726,921 | 3/1998 | Krick ................................... | 713/322 |
| 5,752,263 | 5/1998 | Kranich ............................... | 711/137 |
| 5,784,603 | 7/1998 | Leung et al. ....................... | 395/581 |
| 5,822,556 | 10/1998 | Potter et al. ........................ | 395/381 |
| 5,826,070 | 10/1998 | Olson et al. ........................ | 395/563 |

OTHER PUBLICATIONS

"Floating Point Bypass Dataflow," *IBM Technical Disclosure Bulletin*, vol. 37, No. 09, 545–550 (Sep. 1994).

"Single Cycle/Writeback Cycle Floating Point Denormalization," *IBM Technical Disclosure Bulletin*, vol. 37, No. 04B, 315–318 (Apr. 1994).

"Method to Maintain Pipeline Throughput While Pipeline Depth is Allowed to Vary," *IBM Technical Disclosure Bulletin*, vol. 39, No. 05, 31–32 (May 1996).

*Primary Examiner*—Meng-Ai T. An
*Assistant Examiner*—Mackly Monestime
*Attorney, Agent, or Firm*—Sawyer & Associates; Anthony V. England

[57] ABSTRACT

A method and system for providing direct execution of a serializing instruction in a processor is disclosed. The processor has the serializing instruction and a nonserializing instruction. The processor includes execution logic having a pipeline for executing the nonserializing instruction. The processor also includes logic separate from the execution logic for executing the serializing instruction. The method and system include recognizing the serializing instruction, recognizing the nonserializing instruction, providing the nonserializing instruction to the execution logic, and providing the serializing instruction to the separate logic. The serializing instruction is executed without providing the serializing instruction to the pipeline.

10 Claims, 3 Drawing Sheets

METHOD AND SYSTEM FOR EXECUTING A SERIALIZING INSTRUCTION WHILE BYPASSING A FLOATING POINT UNIT PIPELINE

FIELD OF THE INVENTION

The present invention relates to a method and system for executing floating-point status and control register ("FPSCR") instructions and more particularly to a method and system for direct execution of FPSCR instructions which executes the FPSCR instructions with fewer delays and allows for symmetric floating-point execution pipelines.

BACKGROUND OF THE INVENTION

Conventional floating-point standards, such as the ANSI/IEEE Standard 754-1985 IEEE Standard for Binary Floating-Point Arithmetic ("IEEE standard") require that a status flag be provided for each type of exception that can occur. For example, a status flag must be provided for data overflow. When set, the status flag indicates that the specified exception has occurred.

Certain conventional standards, such as the IEEE standard, also specify that the user shall be able to test and to alter the status flags individually. Furthermore, the IEEE standard specifies that the user should be able to save and restore all status flags at one time.

Some conventional systems utilize a floating-point status and control register ("FPSCR") to store the status flags. The FPSCR is controlled by FPSCR instructions. FPSCR read instructions allow the system to read, or move data from, the FPSCR. Similarly, FPSCR write instructions allow the system to move data to the FPSCR. For example, the FPSCR may be controlled by a set of six FPSCR instructions. Four of these instructions write or move data to the FPSCR. The two of remaining FPSCR instructions read or move data from the FPSCR.

Conventional floating-point systems implement the FPSCR instructions by wholly placing the FPSCR instructions in a floating-point execution unit pipeline. However, the FPSCR instructions are typically executed by FPSCR execution logic placed in series with the pipeline. In other words, the FPSCR execution logic is typically placed after the floating-point execution logic. Nevertheless, additional dedicated FPSCR logic must be placed in the pipeline to allow the FPSCR instruction to pass through the pipeline.

If the pipelines of the conventional system are symmetric, the dedicated FPSCR logic for passing the FPSCR instruction through the pipeline is provided in both pipelines. A system having symmetric pipelines is simpler to design since pipelines are simply replicated. However, since FPSCR instructions occur more rarely than floating-point instructions, the dedicated FPSCR logic in the pipeline will be largely unused. In addition, because FPSCR instructions still require serialization, the additional dedicated FPSCR logic will provide little performance gain.

Where symmetric pipelines are used, each symmetric pipeline may have is own FPSCR execution logic provided after the pipeline's floating-point execution logic. However, the pipelines may also share FPSCR execution logic placed after both floating-point execution units. There is a disadvantage to having symmetric floating-point execution units with only one FPSCR execution logic in series with both pipelines. That is, the FPSCR execution logic is typically more complex because FPSCR instructions can be input to the FPSCR execution logic from either pipeline. Therefore, the FPSCR execution logic must be able to determine which pipeline provides the FPSCR instruction and account for any timing differences.

Other conventional systems use non-symmetric floating-point pipelines. In such systems, an FPSCR instruction is issued to only certain pipelines. Thus, only these pipelines contain dedicated FPSCR logic for passing the FPSCR instruction through the pipeline. Because all FPSCR instructions are passed through a single pipeline, the dedicated FPSCR logic in the pipeline is used more frequently than dedicated FPSCR logic in each of the symmetric pipelines would be used. In addition, because only a limited number of pipelines, such as a single pipeline, provide the FPSCR instruction to the FPSCR execution logic, the FPSCR execution logic is less complex. However, as previously stated, non-symmetric pipelines add complexity to the design because the system cannot be provided simply by duplicating a single execution pipeline.

FPSCR instruction execution may cause multi-cycle delays, regardless of whether a floating-point execution unit pipelines in the system are symmetric. This is because an FPSCR instruction is a serializing instruction. A serializing instruction is one which must have at least portion of the pipeline free in order to run correctly. An FPSCR instruction is typically followed by a series of floating-point instructions. An FPSCR instruction is serializing because it may alter settings in the FPSCR upon which subsequent floating-point instructions depend. As a result, the FPSCR instruction requires that the portion of the pipeline behind the FPSCR instruction be free during execution. If this portion of the pipeline is not free, subsequent instructions may access incorrect settings in the FPSCR.

Because stages in the pipeline must be kept open during execution of the FPSCR instruction and floating-point pipelines are typically deep, a multi-cycle delay is introduced by each FPSCR instruction. Thus, although the FPSCR instruction can be executed relatively quickly by the FPSCR execution logic, delays are introduced as the FPSCR instruction passes through the pipeline. For conventional floating-point pipelines which have many stages, this delay is greater.

Accordingly, what is needed is a system and method for executing FPSCR instructions having reduced delay. It would also be beneficial if the method allowed for symmetric floating-point execution pipelines, making design of pipelines simpler. The present invention addresses such a need.

SUMMARY OF THE INVENTION

The present invention provides a method and system for providing direct execution of a serializing instruction in a processor. The processor has the serializing instruction and a nonserializing instruction. The processor includes execution logic having a pipeline for executing the nonserializing instruction. The processor also includes logic separate from the execution logic for executing the serializing instruction. The method and system comprise recognizing the serializing instruction, recognizing the nonserializing instruction, providing the nonserializing instruction to the execution logic, and providing the serializing instruction to the separate logic. The serializing instruction is executed without providing the serializing instruction to the pipeline.

According to the system and method disclosed herein, the present invention provides direct and faster execution of FPSCR instructions. Delays due to FPSCR instructions are reduced, thereby increasing overall system performance. In addition, symmetric floating-point pipelines are possible, making the system design more simple.

DETAILED DESCRIPTION OF THE INVENTION

The present invention relates to an improvement in execution of floating-point status and control register ("FPSCR") instructions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
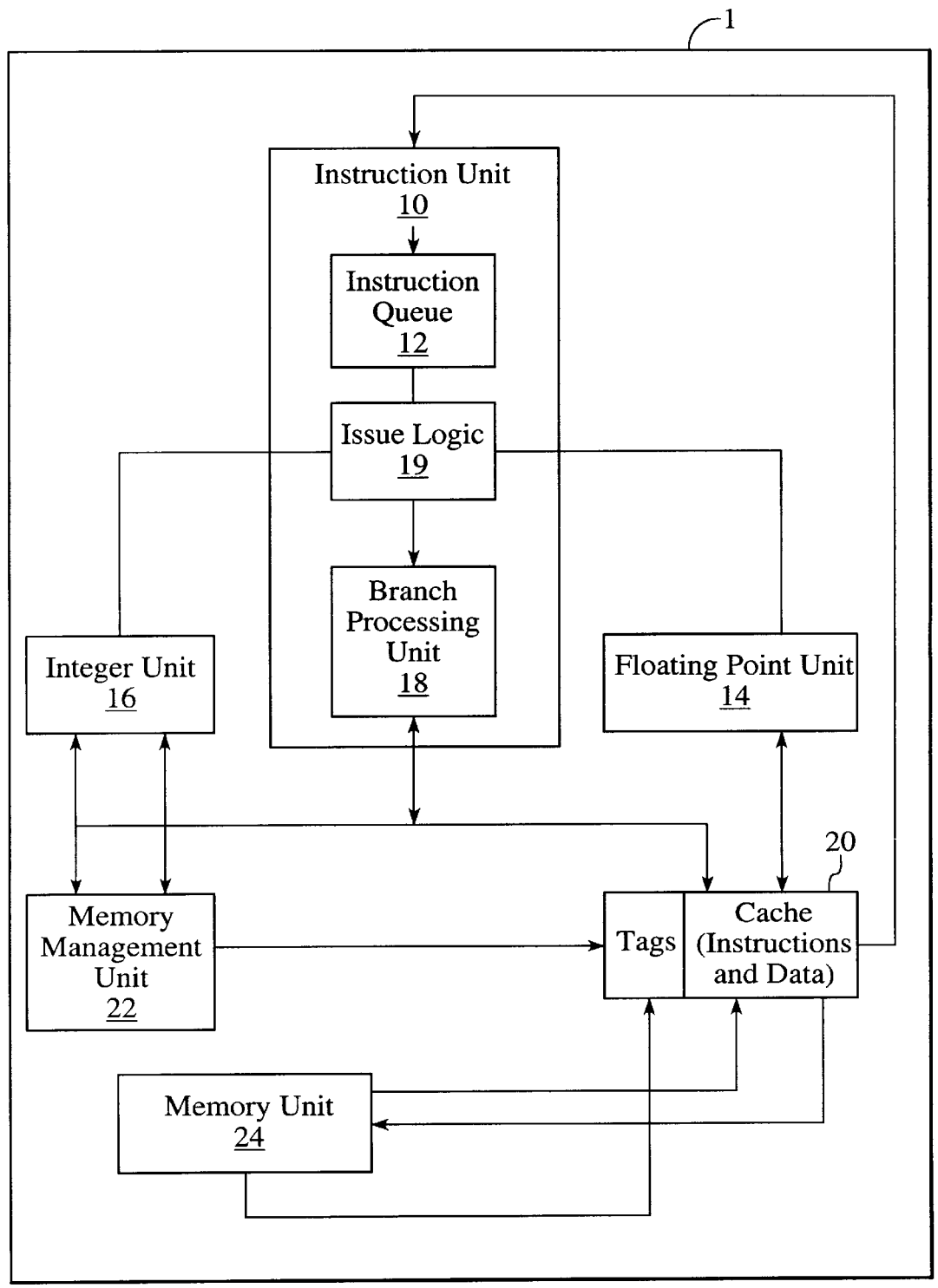
FIG. 1 is a high level block diagram of a processor including a floating-point unit.

FIG. 1 is a block diagram of certain relevant components of a processor system 10 for processing information in accordance with the present invention. In the preferred embodiment, processor 10 is a single integrated circuit superscalar microprocessor. Accordingly, as discussed further hereinbelow, processor 10 includes various units, registers, buffers, memories, and other sections, all of which are formed by integrated circuitry. As shown in FIG. 1, processor 10 includes a plurality of execution components, including the floating-point unit 14 and the integer unit 16.

Figure 2:
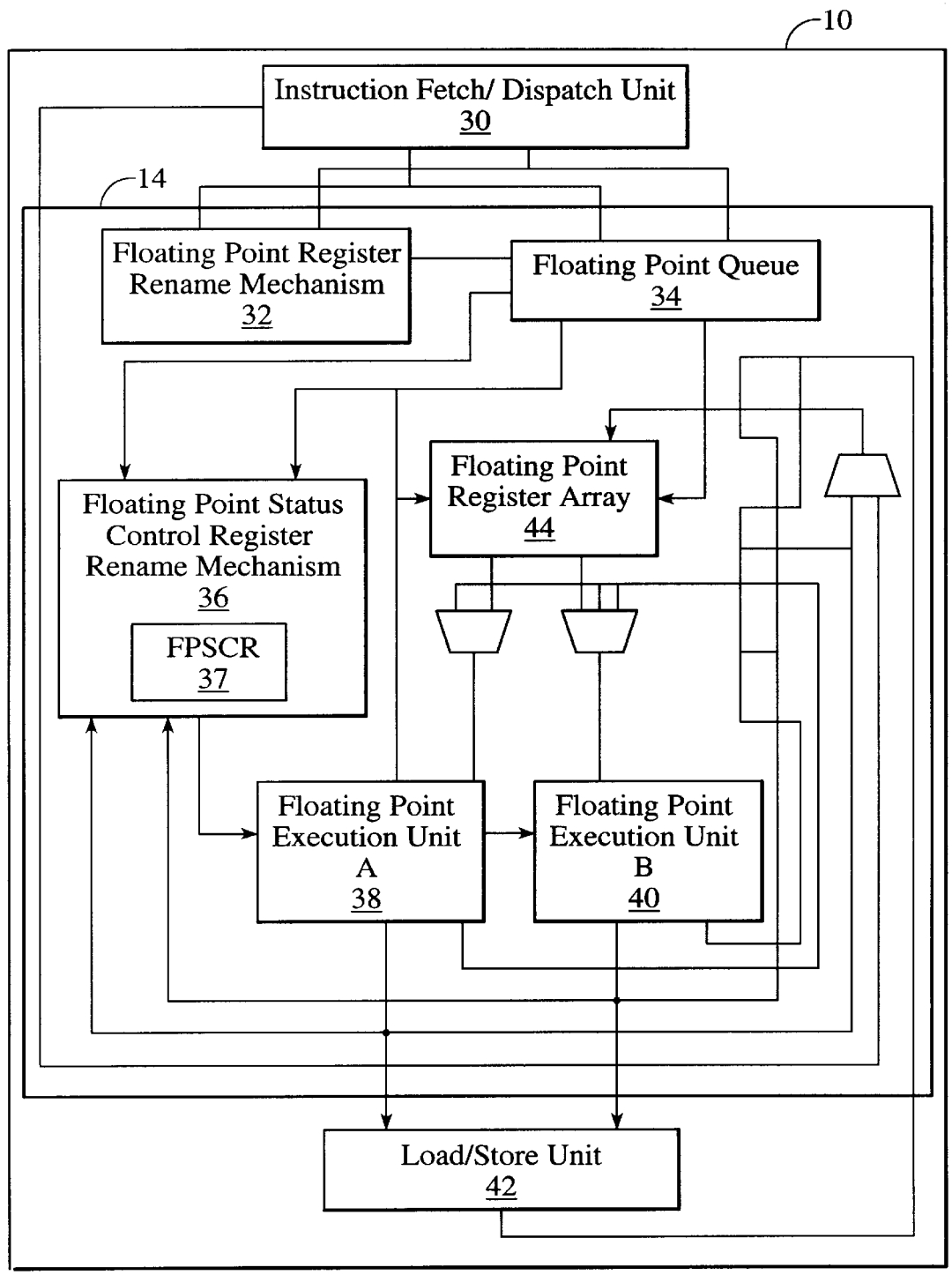
FIG. 2 is a high level block diagram of a floating-point unit in accordance with the method and system.

FIG. 2 depicts floating-point unit 14 in greater detail. The floating-point unit 14, contains two floating-point execution units, FPUA 38 and FPUB 40, each having a floating-point execution pipeline. In addition, floating-point unit 14 has an FPSCR 37 containing the status flags.

Instructions to be executed are provided to the floating-point unit 14 through the instruction fetch/dispatch unit 30. The instruction fetch/dispatch unit 30 places instructions in the floating-point queue ("FPQ") 34. In a preferred embodiment, FPQ 34 is speculative, out-of-order queue. Both floating-point arithmetic instructions and floating-point status and control register instructions are placed in the FPQ 34. The FPSCR instructions control the FPSCR 37.

An FPSCR instruction in the FPQ 34 is dispatched to an FPUA 38 and FPUB 40 for processing by the floating-point execution unit pipeline of the corresponding FPUA 38 or FPUB 40. The floating-point execution unit pipeline through which the FPSCR instruction passes must contain dedicated logic for passing the FPSCR instructions through the pipeline. If, for example, dedicated FPSCR instruction logic was placed in both the FPUA 38 and FPUB 40, symmetric pipelines would be provided with each pipeline carrying FPSCR instructions. If dedicated logic was provided in only one of the FPUA 38 and FPUB 40, the pipelines would be asymmetric and only a single pipeline would carry FPSCR instructions.

Once an FPSCR instruction is passed through the pipeline of FPUA 38 or FPUB 40 by the dedicated logic, the FPSCR instruction can be executed by FPSCR execution logic placed in series with FPUA 38 or FPUB 40. IF the pipelines for the FPUA 38 and FPUB 40 are symmetric, then the FPUA 38 and FPUB 40 can each have FPSCR execution logic can placed after it or the FPUA 38 and the FPUB 40 or can share a single FPSCR execution logic. If the pipelines for the FPUA 39 and the FPUB 40 are asymmetric, then FPSCR execution logic would be provided after only one of the FPUA 38 or FPUB 40.

FPSCR instructions are serializing, requiring that a portion of the floating-point execution unit pipeline after the FPSCR instruction must be open for the FPSCR instruction to be executed. In addition, FPSCR instructions are typically the first instruction of a series of instructions. Often, stages of the pipeline are open prior to such a series of instructions. As a result, the pipeline is often open prior to the FPSCR instruction.

Although an FPSCR instructions can be executed by passing the FPSCR instruction through the floating-point execution unit pipeline, one of ordinary skill in the art will recognize that executing the FPSCR instruction in this manner causes multi-cycle delays. Because an FPSCR instruction is serializing, a portion of the pipeline behind the FPSCR instruction must be kept open during execution of the FPSCR instruction. Subsequent floating-point instructions cannot begin execution until the FPSCR instruction has completed, thereby causing delays. Typically, floating-point execution unit pipelines are relatively deep, causing these delays to be several cycles.

If symmetric pipelines are provided, an FPSCR may pass through either pipeline and use the dedicated FPSCR logic for passing the FPSCR instruction through that pipeline only infrequently. That is, the dedicated FPSCR logic for passing the FPSCR instruction through the pipeline is used for only a portion of the FPSCR instructions issued since each pipeline receives only the portion of the total number of FPSCR instructions. The FPSCR execution logic may also be made more complex because the FPSCR execution logic may need to determine which pipeline is providing the FPSCR instruction. If asymmetric pipelines are provided, the utilization of the dedicated FPSCR logic is higher, but the design of the pipelines becomes more complex. Both symmetric and asymmetric pipelines are subject to delays caused by the FPSCR instructions.

The present invention provides for a method and system for direct execution of FPSCR a instruction in a processor. The processor has the serializing instruction and a nonserializing instruction. The processor includes execution logic having a pipeline for executing the nonserializing instruction. The processor also includes logic separate from the execution logic for executing the serializing instruction. The method and system comprise recognizing the serializing instruction, recognizing the nonserializing instruction, providing the nonserializing instruction to the execution logic, and providing the serializing instruction to the separate logic. The serializing instruction is executed without providing the serializing instruction to the pipeline.

The present invention will be described in terms of a floating-point unit having two execution pipelines. However, one of ordinary skill in the art will readily recognize that this method and system will operate effectively for other types of serializing instructions as well as floating-point units having another number of pipelines. In addition, a preferred embodiment contains dual execution units and two pipelines which are each two stages deep. However, nothing prevents the use of another number of execution units or pipelines, or pipelines of another depth.

Figure 3:
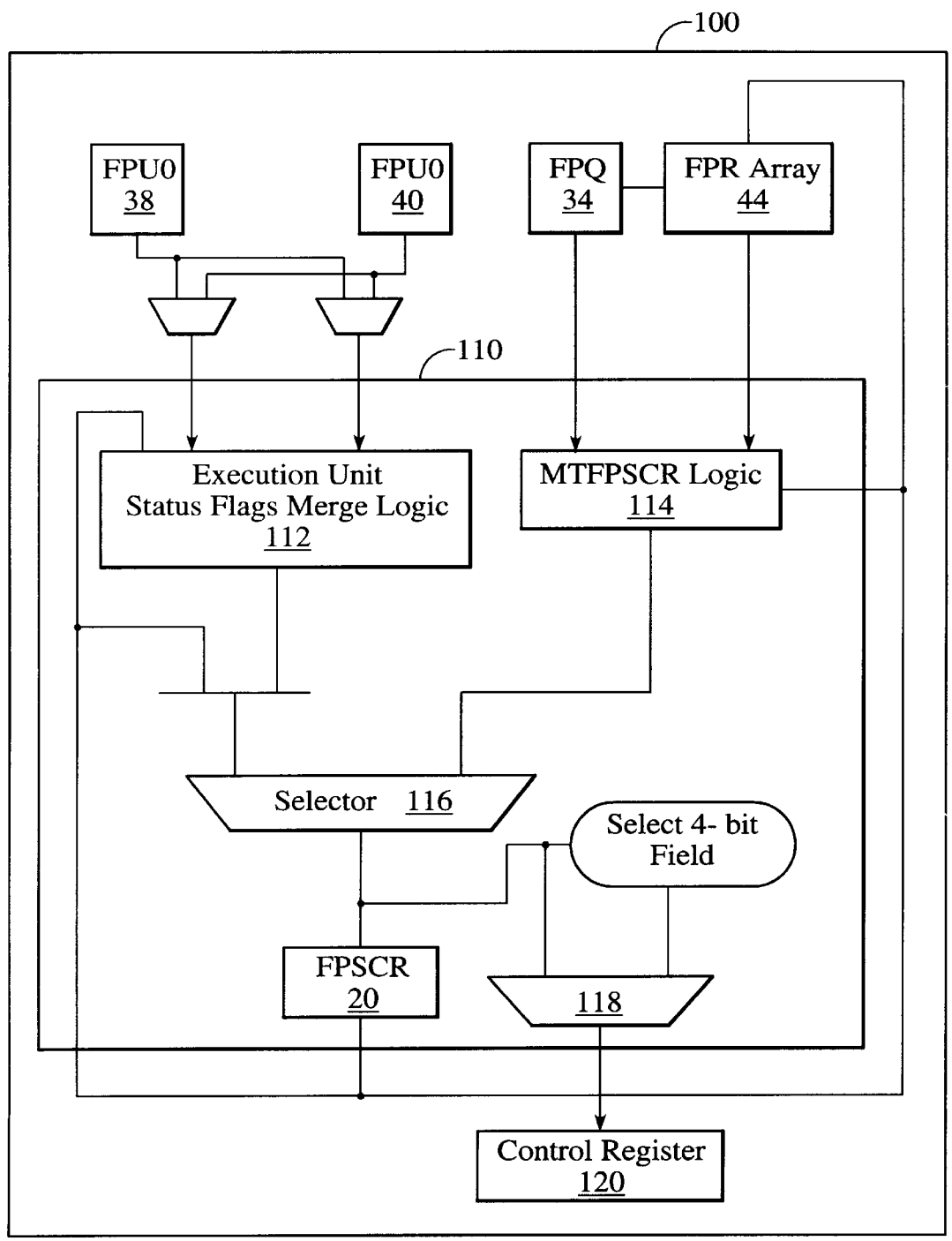
FIG. 3 is a block diagram depicting one embodiment of a system for executing an FPSCR instruction in accordance with the method and system.

To more particularly illustrate the method and system in accordance with the present invention, refer now to FIG. 3 depicting a block diagram of a one embodiment 100 of such a system. Many of the components of the system 100 have already been depicted in FIG. 2. These components are labeled similarly to corresponding components in FIG. 2. For example, the FPQ is labeled FPQ 34 in both FIG. 2 and FIG. 3.

The FPQ 34 contains both FPSCR and floating-point instructions. In contrast to conventional systems, FPQ 34 does not provide FPSCR instructions to the pipelines of either FPUA 38 or FPUB 40. Neither FPUA 38 nor FPUB 40 contains dedicated FPSCR logic for passing the FPSCR instruction through the pipeline. As a result, the pipelines for FPUA 38 and FPUB 40 are symmetric, at least with respect to their lack of dedicated FPSCR logic for passing an FPSCR instruction through the pipeline.

Instead of passing the FPSCR instruction through one of the floating-point pipelines, the FPQ 34 provides the FPSCR instruction directly to separate FPSCR execution logic 10. As a result, the system 100 direct executes the FPSCR instruction. In addition, as discussed above, the FPSCR execution logic 10 does not require dedicated logic in one of the pipelines FPUA 38 or FPUB 40 for passing the FPSCR instruction through the pipeline.

The FPSCR execution logic 10 executes the FPSCR instruction, updating either the FPSCR 20, the FPR Array 44, or the control register 120, depending on the FPSCR instruction. The FPSCR execution logic 10 is capable of executing the FPSCR instruction in a single cycle without requiring a portion of a pipeline behind the FPSCR instruction to be open. Thus, delays introduced by passing an FPSCR instruction through a floating-point execution pipeline are reduced.

To ensure correct execution of all instructions, the FPQ 34 still treats the FPSCR instruction as a serializing instruction. In other words, the FPSCR instruction should still not change settings in the FPSCR 37 which prior dispatched floating-point instruction may use. Thus, in a preferred embodiment, the FPQ 34 does not issue the FPSCR instruction until prior dispatched floating-point instructions have finished execution and are architecturally committed. If the FPQ 34 did not treat the FPSCR instruction as serializing, the FPSCR instruction could alter settings upon which a prior floating-point instruction depends. That is, if the prior floating-point instruction was not architecturally committed before the FPSCR instruction was issued, the prior floating-point instruction might use incorrect data. Thus, the preferred embodiment issues FPSCR instructions only after prior dispatched floating-point instructions have been executed and architecturally committed. Because the FPSCR instruction is generally not preceded by floating-point instructions, but rather is followed by a series of floating-point instructions, this feature of the preferred embodiment does not generally affect the performance of the system 100.

The FPSCR instruction is provided to the move to floating-point status and control register ("MTFPSCR") logic 114 in the FPSCR execution logic 110. The source data for the FPSCR instruction is provided by the FPR array 44. The MTFPSCR logic 114 merges the source or data provided by the user, called immediate data, with the appropriate FPSCR value.

The MTFPSCR logic 114 provides the merged result to the selector 116. In a preferred embodiment, the selector 116 is a multiplexer. Where the MTFPSCR logic 114 provides the merged result due to a valid FPSCR instruction, the selector 116 selects the output from MTFPSCR logic 114 to write to the FPSCR 20. If the system accesses the FPSCR 20 due to a valid floating-point arithmetic instruction, then the selector 116 selects the output from the execution unit status flags merge logic 112. This cooperation between the FPQ 34, and the FPSCR execution logic 1 10 allows the FPSCR instruction to be executed in a single cycle.

In a preferred embodiment, the FPSCR execution logic 110 also executes an FPSCR instruction which moves data from the FPSCR 20, for example to the control register 120 or the FPR array 44. When data is moved from the FPSCR 20 to the control register 120, the FPSCR execution logic 20 reads the data from the FPSCR 20, moves the data to the control register 120, and rewrites the data to the FPSCR 20. The MTFPSCR logic 114 provides a reset of the FPSCR 20, and the appropriate data from the FPSCR 20 is provided to the control register 120. Consequently, the FPSCR execution logic 110 can be used to execute all FPSCR instructions in a single cycle, without the delays due to passing an FPSCR instruction through a floating-point execution unit pipeline.

A method and system has been disclosed for direct execution of an FPSCR instruction. Because the system and method execute the FPSCR instruction using separate FPSCR execution logic 110, the FPSCR instruction is executed in a single cycle. By bypassing the execution unit pipeline, the method and system provide significant improvement in the number of cycles required to execute the FPSCR instruction. For example, in a preferred embodiment having dual two-deep floating-point execution pipelines, conventional approaches would have a two cycle execution latency for FPSCR instructions. In contrast, the method and system achieve a one cycle execution latency. If the method and system are used in a processor having a deeper pipeline, even greater reduction in delays are achieved. In addition, the method and system allow the processor to have symmetric pipelines without dedicated FPSCR logic for passing the FPSCR instruction through the pipeline. Thus, design of multiple floating-point execution pipelines is simplified.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing direct execution of a serializing instruction in a processor, the processor including execution logic having a pipeline for executing a nonserializing instruction, the execution logic including a floating-point execution unit, the nonserializing instruction being a floating-point instruction, the system comprising:

separate logic, different from the execution logic, for executing a serializing instruction, the serializing instruction being a floating point status and control register (FPSCR) instruction, the separate logic being FPSCR execution logic; and an instruction queue, coupled directly to the separate logic and to the execution logic, for storing both the serializing instruction and the nonserializing instruction, recognizing the serializing instruction and the nonserializing instruction, providing the nonserializing instruction to the execution logic, and providing the serializing instruction to the separate logic so that the serializing instruction is executed without the serializing instruction being provided to the pipeline of the execution logic.

2. The system of claim 1 wherein for a nonserializing instruction provided to the execution logic prior to the serializing instruction being provided to the separate logic, the instruction queue provides the serializing instruction to the separate logic after the execution logic has completed executing the nonserializing instruction.

3. The system of claim 2 wherein the separate logic comprises:

move to FPSCR logic for providing a first resultant to the FPSCR, the first resultant being provided to the FPSCR if the serializing instruction write to the FPSCR.

4. The system of claim 3 wherein the FPSCR further includes a plurality of status flags; and wherein the separate logic comprises:

status flag logic coupled to the execution logic for providing a second resultant if an exception has occurred; and selector means coupled to the move to FPSCR logic, the status flag logic, and the FPSCR, the selector means for providing the first resultant if the serializing instruction writes to the FPSCR and is valid, the selector means for providing the second resultant if the serializing instruction is not valid.

5. The system of claim 4 wherein the selector means is a multiplexer.

6. The system of claim 5 wherein the execution logic comprises a plurality of execution units, each execution unit having an execution unit pipeline.

7. The system of claim 6 wherein the processor includes a clock; and wherein the separate logic executes the serializing instruction in a single cycle of the clock.

8. A method for providing direct execution of a serializing instruction in a processor, the processor including execution logic having a pipeline for executing a nonserializing instruction, and separate logic different from the execution logic for executing a serializing instruction and an instruction queue coupled with the execution logic and the separate logic, the execution logic including a floating-point execution unit, the nonserializing instruction being a floating-point instruction and the serializing instruction being a floating point status and control register (FPSCR) instruction, the separate logic being FPSCR execution logic, and the instruction queue capable of storing the serializing instruction and the nonserializing instruction, the method comprising the steps of:

a) recognizing the serializing instruction;

b) recognizing the nonserializing instruction;

c) providing the nonserializing instruction to the execution logic from the instruction queue; and d) providing the serializing instruction to the separate logic directly from the instruction queue so that serializing instruction is executed without being provided to the pipeline of the execution logic.

9. The method of claim 8 wherein when step (c) precedes step d), step d) comprises:

d1) waiting until the nonserializing instruction execution is complete before providing the serializing instruction to the separate logic.

10. The method of claim 9 wherein the processor includes a clock, the method further comprising the step of executing the serializing instruction in a single cycle of the clock.

* * * * *